United States Patent
Teranishi et al.

(10) Patent No.: US 11,722,206 B2
(45) Date of Patent: Aug. 8, 2023

(54) WIRELESS COMMUNICATION SYSTEM

(71) Applicant: NATIONAL INSTITUTE OF INFORMATION AND COMMUNICATIONS TECHNOLOGY, Koganei (JP)

(72) Inventors: Yuuichi Teranishi, Tokyo (JP); Takashi Kimata, Tokyo (JP); Eiji Kawai, Tokyo (JP); Hiroaki Harai, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 196 days.

(21) Appl. No.: 17/422,025

(22) PCT Filed: Dec. 13, 2019

(86) PCT No.: PCT/JP2019/048848
§ 371 (c)(1),
(2) Date: Jul. 9, 2021

(87) PCT Pub. No.: WO2020/145026
PCT Pub. Date: Jul. 16, 2020

(65) Prior Publication Data
US 2022/0103242 A1    Mar. 31, 2022

(30) Foreign Application Priority Data
Jan. 9, 2019    (JP) .............................. JP2019-002237

(51) Int. Cl.
*H04B 7/155*    (2006.01)
*H04W 4/38*    (2018.01)
(Continued)

(52) U.S. Cl.
CPC .............. *H04B 7/155* (2013.01); *H04W 4/38* (2018.02); *H04W 4/46* (2018.02); *H04W 84/047* (2013.01)

(58) Field of Classification Search
CPC ......... H04W 84/18; H04W 4/40; H04W 4/38; H04W 88/10; H04W 88/06; H04W 4/70;
(Continued)

(56) References Cited

U.S. PATENT DOCUMENTS

2010/0145570 A1    6/2010    Asahara et al.
2014/0376359 A1    12/2014   Nishikata et al.
(Continued)

FOREIGN PATENT DOCUMENTS

JP    2008077143 A    4/2008
JP    2010140072 A    6/2010
(Continued)

OTHER PUBLICATIONS

Japanese Office Action dated Nov. 15, 2022 (and English translation thereof) issued in counterpart JP Application No. 2019-002237.
(Continued)

*Primary Examiner* — Khalid W Shaheed
(74) *Attorney, Agent, or Firm* — Holtz, Holtz & Volek PC

(57) ABSTRACT

A wireless communication method collects data generated from a plurality of moving entities. The wireless communication method includes performing first communication in which a control device controls a condition of data forwarding in the plurality of moving entities, via long-distance wireless communication; performing second communication that includes carrying out communication between one of the moving entities and a relay, or communication among the plurality of moving entities, via short-distance wireless communication, by using a DTN (Delay Tolerant Network), which employs a store-carry-and-forward process; and per-
(Continued)

forming third communication that includes carrying out communication between the control device and the relay, or communication between the control device and one of the moving entities, via wired communication or the long-distance wireless communication.

9 Claims, 5 Drawing Sheets

(51) Int. Cl.
*H04W 4/46* (2018.01)
*H04W 84/04* (2009.01)

(58) Field of Classification Search
CPC . H04W 12/033; H04W 4/029; H04W 84/005; H04W 28/02; H04L 51/04; H04L 65/1083
See application file for complete search history.

(56) References Cited

U.S. PATENT DOCUMENTS

| | | | |
|---|---|---|---|
| 2015/0296019 A1 | 10/2015 | Onishi et al. | |
| 2016/0205030 A1* | 7/2016 | Kudou | H04L 47/30 370/310 |
| 2016/0212599 A1* | 7/2016 | Kudou | H04W 4/12 |
| 2017/0064763 A1 | 3/2017 | Fujimoto et al. | |
| 2017/0168506 A1 | 6/2017 | Cooper et al. | |
| 2018/0316763 A1 | 11/2018 | Wang | |
| 2019/0020701 A1* | 1/2019 | Barritt | H04L 69/08 |

FOREIGN PATENT DOCUMENTS

| | | |
|---|---|---|
| JP | 2016133882 A | 7/2016 |
| JP | 2016161976 A | 9/2016 |
| JP | 2017046238 A | 3/2017 |
| JP | 2018082300 A | 5/2018 |
| WO | 2013133211 A1 | 9/2013 |

OTHER PUBLICATIONS

Ku, et al., "Towards Software Defined VANET; Architecture and Services", 2014 13th Annual Mediterranean Ad Hoc Networking Workshop (MED-HOC-NET), Jul. 8, 2014, pp. 103-110.
Soares, et al., "A Layered Architecture for Vehicular Delay Tolerant Networks", 2009 IEEE Symposium on Computers and Communications, Dec. 18, 2009, pp. 122-127.
International Search Report (ISR) (and English language translation thereof) dated Feb. 25, 2020 issued in International Application No. PCT/JP2019/048848.
Written Opinion dated Feb. 25, 2020 issued in International Application No. PCT/JP2019/048848.
Inoue, et al., "Think about the role of cars in the age of IT convergence", SEC journal vol. 9, No. 1, Information-Technology Promotion Agency, Japan; Mar. 2013, p. 4.
Indian First Examination Report dated Mar. 8, 2022, issued in counterpart Indian Application No. 202117030315.

* cited by examiner

WIRELESS COMMUNICATION SYSTEM

TECHNICAL FIELD

The present invention relates to a wireless communication system that collects data generated from a plurality of moving entities.

BACKGROUND ART

Heretofore, for example, the communication device of patent literature 1 has been proposed as a communication device to be mounted on a moving entity such as a vehicle.

The communication device of patent literature 1 has a wide area communication unit connected to a data communication network, a vehicle-to-vehicle communication unit, which communicates directly with communication devices mounted on other vehicles, and a vehicle-to-vehicle communication control device that allows data to be transmitted using the vehicle-to-vehicle communication unit under predetermined conditions, that is, a processing unit.

CITATION LIST

Patent Literature

Patent Literature 1: Japanese Unexamined Patent Application Publication No. 2016-133882

SUMMARY OF INVENTION

Problem to be Solved by the Invention

Here, it is necessary to collect data generated from a plurality of moving entities so that the data can be used for various purposes. However, for example, when wide area communication is used, the bandwidth to forward data is limited, and, when vehicle-to-vehicle communication is used, the buffer size is limited. Efficient collection of data under such restrictions is an issue. Regarding this, the communication device of patent literature 1 can only reduce the occurrence of congestion in vehicle-to-vehicle communication, and it is difficult to collect data efficiently.

Consequently, the present invention has been made in view of the problem described above, and it is therefore an object of the present invention to provide a wireless communication system that makes it possible to collect data efficiently.

Means for Solving the Problems

In order to solve the problem described above, the present inventors have invented a wireless communication system that collects data generated from a plurality of moving entities. The wireless communication system has a first communication means, a second communication means, and a third communication means. The first communication means, allows a control device to control the conditions of data forwarding in a plurality of moving entities via long-distance wireless communication. The second communication means, carries out communication between a moving entity and a relay unit, or communication among a plurality of moving entities, via short-distance wireless communication, using a DTN (Delay Tolerant Network), which employs the store-carry-and-forward-process. The third communication means carries out communication between a control device and a relay unit, via wired communication or long-distance wireless communication.

The wireless communication system according to the first invention is a wireless communication system that collects data generated from a plurality of moving entities, and this wireless communication system has first communication means for allowing a control device to control a condition of data forwarding in the plurality of moving entities, via long-distance wireless communication, second communication means for carrying out communication between a moving entity and a relay unit, or communication among the plurality of moving entities, via short-distance wireless communication, by using a DTN (Delay Tolerant Network), which employs a store-carry-and-forward process, and third communication means for carrying out communication between the control device and the relay unit, via wired communication or the long-distance wireless communication.

Based on the first invention, in the wireless communication system according to a second invention, the first communication means has presence checking means for periodically transmitting presence notification data to indicate a communication reachability status of the moving entity, from the moving entity to the control device, and generation command means for transmitting generation command data, including a sensor type, a data identifier, and a deadline for transmission, from the control device having received the presence notification data, to the moving entity.

Based on the second invention, in the wireless communication system according to a third invention, the second communication means has message transmission means for transmitting a message, generated based on the generation command data, from a moving entity having received the generation command data, to the relay unit or another moving entity, and the third communication means has relay means for transmitting the message from the relay unit having received the message, to the control device.

Based on the third invention, in the wireless communication system according to a fourth invention, the third communication means has storing means for, when the control device receives the message generated based on the generation command data, adding the identifier associated with the message to a delivered-identifier list, built in advance, and storing the delivered-identifier list.

Based on the fourth invention, in the wireless communication system according to a fifth invention, and the first communication means has list acquisition means for allowing the moving entity to acquire the delivered-identifier list, and the wireless communication system further has, after the list acquisition means, deletion means for, when the message associated with the identifier included in the delivered-identifier list is stored in the storage buffer of the moving entity, deleting the message stored in the storage buffer.

Based on the fourth invention, in the wireless communication system according to a sixth invention, the first communication means has list acquisition means for allowing the moving entity to acquire the delivered-identifier list, and the second communication means has after the list acquisition means, rejection means for, when the message associated with the identifier included in the delivered-identifier list is transmitted to the moving entity that has acquired the delivered-identifier list, rejecting to receive the message.

Advantageous Effects of Invention

According to the first invention, the first communication means allows the control device to control the conditions of data forwarding in the plurality of moving entities via long-distance wireless communication. Also, the second communication means carries out communication between a moving entity and the relay unit, or communication among the plurality of moving entities, via short-distance wireless communication. Also, the third communication means carries out communication between the control device and the relay unit. Consequently, each moving entity can transmit and receive data, without involving long-distance wireless communication. This makes it possible to collect data efficiently.

Also, according to the first invention, the second communication means is implemented using a DTN which employs a store-carry-and-forward process. Consequently, even data that is generated from a moving entity that is present in a location where communication with the relay unit is difficult can be received via another moving entity. By this means, even when a plurality of moving entities are present in a wide range, it is still possible to alleviate the decrease in the efficiency of data collection.

In particular, according to the second invention, the first communication means has presence checking means and generation command means for transmitting generation command data from the control device to the moving entity. Consequently, it is possible to control the conditions of data forwarding for the moving entity by taking into account the communication status of the moving entity. This makes it possible to collect data even more efficiently.

In particular, according to the third invention, the third communication means has relay means for transmitting messages from the relay unit to the control device. That is, messages are collected in the control device via communication means that is provided independent of short-distance wireless communication. Consequently, messages (data) can be collected easily from a plurality of moving entities, compared to the case where messages are transmitted directly to the control device. This makes it possible to collect data even more efficiently.

In particular, according to the fourth invention, the third communication means has storing means for adding the identifiers associated with messages to a delivered-identifier list, and storing this. Consequently, the management of messages generated by the moving entities can be easily realized by using the control device. This makes it possible to easily manage the data received from the moving entities.

In particular, according to the fifth invention, when a message associated with an identifier included in the delivered-identifier list is stored in the storage buffer of a moving entity, the deletion means deletes the message stored in the storage buffer. Consequently, it is possible to control the messages already transmitted to the control device against occupying the storage buffer for use for the DTN forwarding function. This makes it possible to reduce the volume of redundant traffic caused by messages (data) already transmitted.

In particular, according to the sixth invention, the second communication means has rejection means for rejecting to receive messages associated with the identifiers included in the delivered-identifier list. Consequently, it is possible to prevent the messages already transmitted to the control device from occupying the storage buffer for use for the DTN forwarding function. This makes it possible to alleviate the increase in the volume of redundant traffic caused by messages (data) already transmitted.

DESCRIPTION OF EMBODIMENTS (Embodiment: Wireless Communication System 100)

Figure 1:
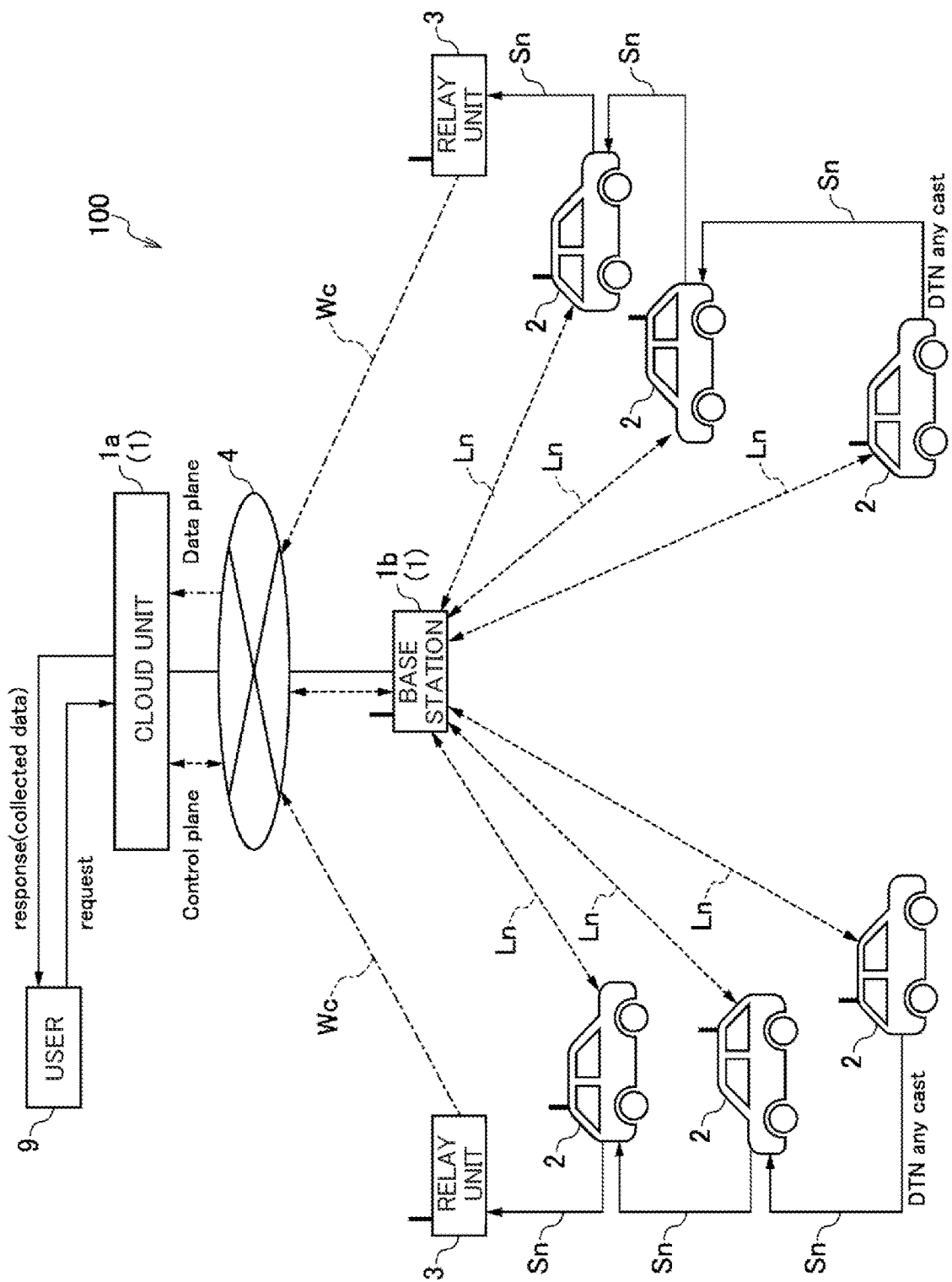
FIG. 1 is a schematic diagram to show an example of an overview of a wireless communication system according to an embodiment.

Hereinafter, the wireless communication system 100 as an embodiment of the present invention will be described in detail. FIG. 1 is a schematic diagram to show an example of an overview of the wireless communication system 100 of the present embodiment.

The wireless communication system 100 is used to collect data generated from a plurality of moving entities 2. As shown in FIG. 1, for example, the wireless communication system 100 has a control device 1, a plurality of moving entities 2, and a relay unit 3.

In the wireless communication system 100, for example, in response to a request from a user 9, a data generation command is transmitted from the control device 1 to a plurality of moving entities 2. After that, data (messages) that is generated from the plurality of moving entities 2 is collected in the control device 1, via the relay unit 3. Note that, in FIG. 1, the "request" from the user 9 is represented by "request", and the operation of "transmitting" the collected data to the user 9 is represented by "response (collected data)".

As for the data to be collected in the wireless communication system 100, for example, when the moving entity 2 is a car, traffic information (congestion of cars), information about the sensor installed in the car, information about the shape of the road and/or the like, the weather (rain, hail, snow, wind, etc.), the condition of the driver or the car (the condition of the engine, the driver's reaction time, etc.) and accidental phenomena (fog, flood, earthquake, entry of animals, etc.) may be used, and these can be set in advance based on request from the user 9.

As for the control device 1, for example, a cloud server is used. The control device 1 may have, for example, a base station 1b that communicates with a plurality of moving entities 2. For the moving entities 2, terminals such as IoT (Internet of Things) devices or smartphones may be used, besides cars. In the wireless communication system 100, for example, the configuration of the moving entities 2 may be set according to request from the user 9. As for the relay unit 3, for example, a fixed road side unit may be used, or, for example, a car and/or the like may be used, in the same manner as the moving entities 2.

In the wireless communication system 100, communication between the control device 1 and the plurality of moving entities 2 is carried out via long-distance wireless communication Ln, and, for example, the control device 1 controls the conditions of data forwarding in the plurality of moving entities 2.

For long-distance wireless communication Ln, a known communication scheme such as, for example, LPWA (Low Power Wide Area) may be used, and a connection to, for example, a public communication network (Internet 4) may be established. Note that, in FIG. 1, the broken-line arrows (control plane) represent the communication channels for long-distance wireless communication Ln.

The conditions of data forwarding are controlled by, for example, generation command data generated by the control device 1, and include conditions such as the data to be generated by the moving entities 2, the deadline for transmission, and so forth. The generation command data includes information for controlling the conditions of data forwarding.

The control device 1 may have, for example, a cloud unit 1a and a base station 1b. In this case, the plurality of moving entities 2 communicate with the base station 1b via long-distance wireless communication Ln. The base station 1b communicates with the cloud unit 1a via the Internet 4.

In the wireless communication system 100, communication between the moving entities 2 and the relay unit 3, or communication among the plurality of moving entities 2, is carried out via short-distance wireless communication Sn. For short-distance wireless communication Sn, the known communication scheme, for example, IEEE802.11p, is used. Note that, in FIG. 1, the solid-line arrows represent the communication channels for short-distance wireless communication Sn.

Communication between the moving entities 2 and the relay unit 3, or communication among a plurality of moving entities 2, is carried out using a DTN (Delay Tolerant Network), which employs the store-carry-and-forward-process. Also, anycast routing may be used to transmit messages (data) to a relay unit. As for the DTN protocol, for example, epidemic routing protocol, which does not depend on mobility models and/or the like, is used.

For example, a moving entity 2 communicates data to other nearby moving entities 2. The communicated data corresponds to a set of data which includes the received-and-stored data from other mobile entities 2 and the data generated on the mobile entity 2. Consequently, the size of the set of data increases every time data is communicated between these moving entities 2, and the set of data is eventually transmitted to the relay unit 3. By this means, the efficiency of data collection can be improved compared to the case where data is transmitted to the relay unit 3 on a per moving entity 2 basis. Note that when, for example, a plurality of relay units 3 are provided as shown in FIG. 1, any of these relay units 3 is set as the destination of the transmission of the set of data.

In the wireless communication system 100, communication between the control device 1 and the relay unit 3 is carried out via wired communication Wc or long-distance wireless communication Ln. For wired communication Wc, a known communication scheme such as optical fiber communication is used. Note that, in FIG. 1, the arrows of alternate long and short dash lines (data plane) represent the communication channels for wired communication Wc.

The control device 1 receives set of data via the Internet 4 from the relay units 3 via, for example, wired communication Wc. Note that, for example, instead of wired communication Wc, set of data may be transmitted and received via long-distance wireless communication Ln.

Figure 2:
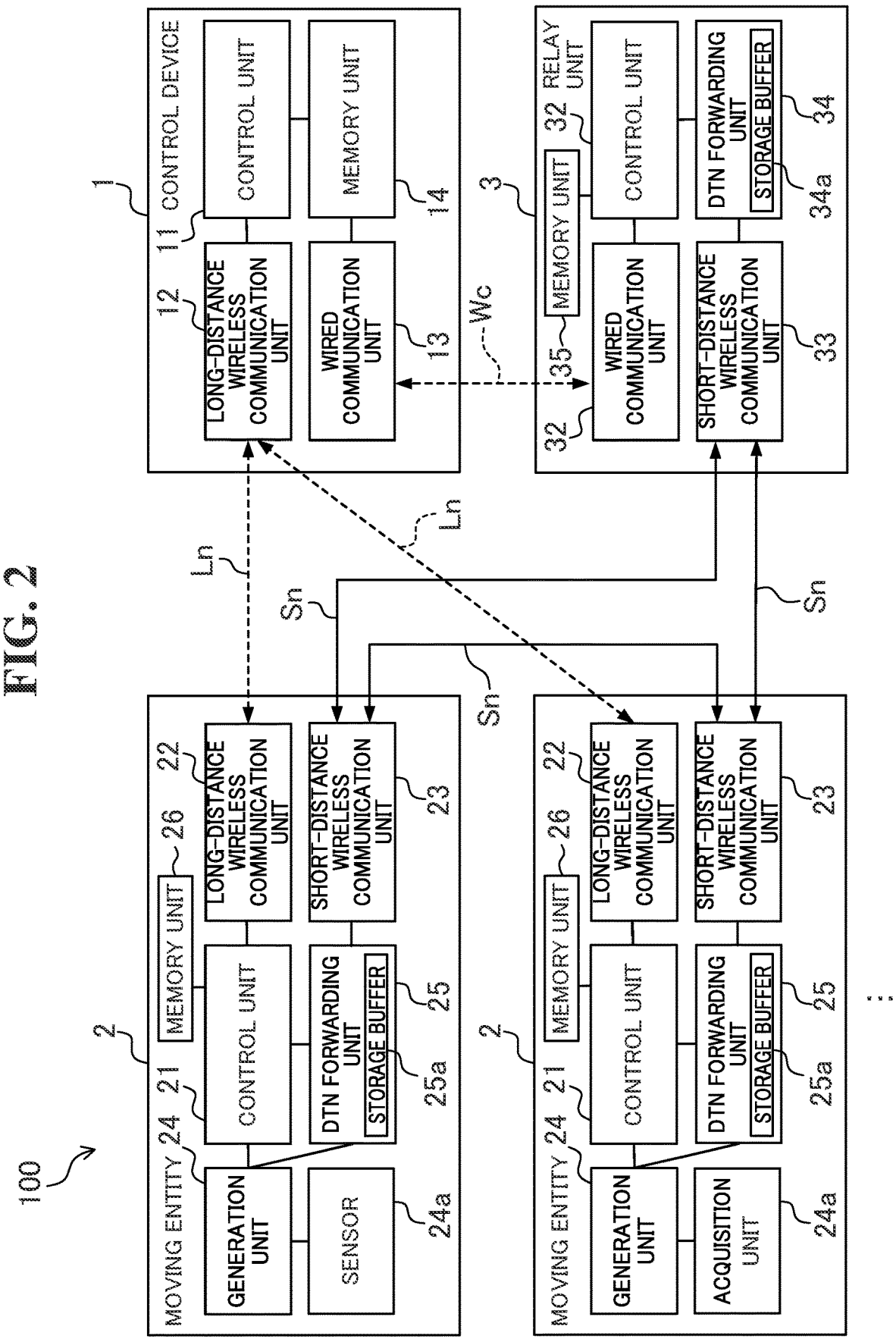
FIG. 2 is a schematic diagram to show an example of the configuration of the wireless communication system according to the embodiment.

Next, the configurations of the control device 1, the moving entities 2, and the relay units 3 will be described. FIG. 2 is a schematic diagram to show examples of the configurations of the control device 1, the moving entity 2, and the relay unit 3.

The control device 1 has a control unit 11, a long-distance wireless communication unit 12, a wired communication unit 13, and a memory unit 14, and each configuration is connected by an internal bus. In the control unit 11, for example, a cloud unit 1a may have the control unit 11, the wired communication unit 13, and the memory unit 14, and a base station 1b may have the long-distance wireless communication unit 12. In this case, the cloud unit 1a and the base station 1b have an Internet communication unit (not shown), and are connected with each other via the Internet 4.

The control unit 11 controls the overall operation of the control device 1, and generates generation command data to transmit to the moving entities 2, and/or the like. For the control unit 11, for example, a processor such as a CPU (Central Processing Unit) is used.

The long-distance wireless communication unit 12 communicates with a plurality of moving entities 2 via long-distance wireless communication Ln. The long-distance wireless communication unit 12 transmits, for example, generation command data to the plurality of moving entities 2. By this means, the control device 1 can control the conditions of data forwarding in the plurality of moving entities 2.

The wired communication unit 13 communicates with the relay unit 3 via wired communication Wc. The wired communication unit 13 receives, for example, a set of data from the relay unit 3. This makes it possible to efficiently collect a plurality of data generated from the plurality of moving entities 2.

Data (messages) and/or the like generated by the plurality of moving entities 2 are stored in the memory unit 14. For the memory unit 14, for example, besides an HDD (Hard Disk Drive), a data storing device such as an SSD (Solid State Drive) is used. The memory unit 14 includes, for example, a RAM (Random Access Memory) and a ROM (Read Only Memory), and stores programs and/or the like to be executed on the control device 1. Note that each function to be executed by the control device 1 can be realized as the control unit 11 executes the programs stored in the memory unit 14 using the RAM as a work area.

A moving entity 2 has a control unit 21, a long-distance wireless communication unit 22, a short-distance wireless communication unit 23, a generation unit 24, a DTN forwarding unit 25, and a memory unit 26, and each configuration is connected by an internal bus.

The control unit 21 controls, for example, the overall operation of the moving entities 2. For the control unit 21, for example, a processor such as a CPU is used.

The long-distance wireless communication unit 22 communicates with the control device 1 via long-distance wireless communication Ln. The long-distance wireless communication unit 22 receives, for example, generation command data from the control device 1.

The short-distance wireless communication unit 23 communicates with the relay unit 3 or other moving entities 2 via short-distance wireless communication Sn.

In this case, data is transmitted and received using DTN. The generation unit 24 generates data based on the generation command data. The generation unit 24 has, for example, an acquisition unit 24a, and generates data from a signal and/or the like obtained by the acquisition unit 24a. For the acquisition unit 24a, for example, an image-capturing device such as a camera is used, besides a sensor device such as a gyro sensor, an engine temperature sensor, and a steering wheel state sensor.

The DTN forwarding unit 25 controls communication based on the DTN. The DTN forwarding unit 25 has a storage buffer 25a, in which the data generated in the generation unit 24 is stored. A plurality of data generated by the plurality of moving entities 2 are stored in the storage buffer 25*a*. A processor such as a CPU may be used as a part of the DTN forwarding unit 25, or may be embodied integrally with the control unit 21, for example. For the storage buffer 25*a*, for example, besides an HDD, a data storing device such as an SSD is used.

The memory unit 26 stores the generation command data generated by the control device 1 and/or the like. For the memory unit 26, for example, a data storing device such as an SSD may be used, besides an HDD, and may be embodied integrally with the storage buffer 25*a*, for example. The memory unit 26 includes, for example, a RAM and a ROM, and stores programs and/or the like to be executed by the moving entity 2. Note that each function to be executed by the moving entity 2 can be realized as the control unit 21 executes the programs stored in the memory unit 26 using the RAM as a work area. The memory unit 26 may store, for example, the same data as in the storage buffer 25*a*.

The relay unit 3 has a control unit 31, a wired communication unit 32, a short-distance wireless communication unit 33, a DTN forwarding unit 34, and a memory unit 35, and each configuration is connected by an internal bus.

The control unit 31 controls the operation of the entire relay unit 3 and the like. For the control unit 31, for example, a processor such as a CPU is used.

The wired communication unit 32 communicates with the control device 1 via wired communication Wc. The wired communication unit 32 transmits, for example, a set of data received from the moving entities 2, to the control device 1.

The short-distance wireless communication unit 33 communicates with the moving entities 2, via short-distance wireless communication Sn. At this time, data is transmitted and received using the DTN, and the set of data stored in the storage buffers 25*a* of the moving entities 2 are received.

The DTN forwarding unit 34 controls communication based on the DTN.

The DTN forwarding unit 34 has a storage buffer 34*a*, in which the received set of data is stored. A processor such as a CPU may be used as a part of the DTN forwarding unit 34, and may be embodied integrally with the control unit 21, for example. For the storage buffer 34*a*, for example, besides an HDD, a data storing device such as an SSD is used.

The memory unit 35 may store, for example, the same data as in the storage buffer 34*a*. For the memory unit 35, for example, besides an HDD, a data storing device such as an SSD may be used, and may be embodied integrally with the storage buffer 34*a*, for example. The memory unit 35 includes, for example, a RAM and a ROM, and stores programs and/or the like to be executed by the relay unit 3. Note that each function to be executed by the relay unit 3 can be realized as the control unit 31 executes the programs stored in the memory unit 35 using the RAM as a work area.

(Embodiment: Example of Operation of Wireless Communication System 100)

Figure 3:
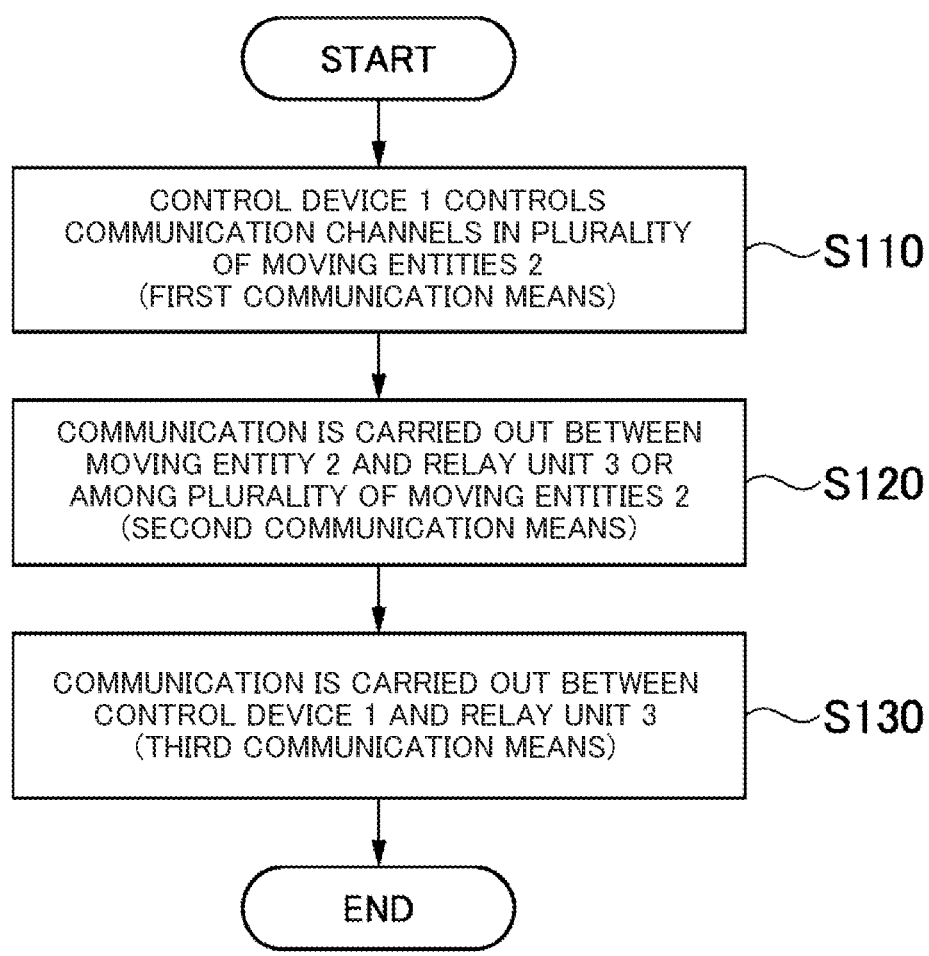
FIG. 3 is a flowchart to show an example of the operation of the wireless communication system according to the embodiment.

Next, the operation of the wireless communication system 100 according to the present embodiment will be described below. FIG. 3 is a flowchart to show an example of the operation of the wireless communication system 100 according to the present embodiment.

<First Communication Means S110>

First, the control device 1 controls the conditions of data forwarding in a plurality of moving entities 2 via long-distance wireless communication Ln (first communication means S110). In the first communication means S110, communication between the long-distance wireless communication unit 12 of the control device 1 and the long-distance wireless communication unit 12 of each moving entity 2 is carried out via long-distance wireless communication Ln, and generation command data is transmitted from the control device 1 to the plurality of moving entities 2. By this means, the conditions of data forwarding in the moving entities 2 can be controlled. Note that the first communication means S110 may carry out communication via, for example, the Internet 4.

The generation command data is generated by the control unit 11 of the control device 1, based on request from a user 9, for example. In this case, based on, for example, the addresses of moving entities 2 received from the user 9, the control device 1 transmits generation command data to the corresponding moving entities 2.

The generation command data includes information such as the types of sensors for collecting data, the identifiers of data, and TTL (Time To Live: deadline for transmission). The types of sensors may include information that limits, for example, the surrounding environments of the moving entities 2, the types of the moving entities 2 (for example, the types of car), and measurement conditions such as average speed. As for the identifiers, for example, random numbers having a predetermined length is used. Note that the generation command data may include, for example, control information such as starting the data forwarding, pausing the data forwarding, and stopping the data forwarding, in addition to data generation in the moving entities 2.

The memory unit 14 of the control device 1 stores, for example, the generated generation command data, the identifiers included in the generation command data, and/or the like. This makes it possible to identify the collected data (message). Note that the number of moving entities 2, to which the generation command data is transmitted from the control device 1, and the frequency and period to transmit the generation command, and/or the like are unspecified.

The first communication means S110 may be able to judge whether or not to generate data on the moving entities 2, based on, for example, the generation command data. In this case, for example, the DTN forwarding unit 25 of a moving entity 2 may judge whether or not the moving entity 2 can generate data, based on the types of sensors included in the received generation command data and/or the like.

<Second Communication Means S120>

Next, communication between the moving entities 2 and the relay unit 3, or communication among a plurality of moving entities 2, is carried out via short-distance wireless communication Sn, using the DTN which employs the store-carry-and-forward-process (second communication means S120). The second communication means S120 carries out communication between the short-distance wireless communication unit 23 of each moving entity 2 and the short-distance wireless communication unit 33 of the relay unit 3 via short-distance wireless communication Sn.

In the second communication means S120, data is transmitted and received using the DTN which employs the store-carry-and-forward-process, so that, every time data is transmitted and received between the moving entities 2, data is stored and the amount of data becomes larger. The stored data (set of data) is eventually transmitted to the relay unit 3. Consequently, even when a moving entity 2 that is present in a location where communication with the relay unit is difficult generates data, the data can be received via another moving entity 2. Note that the moving entity 2 and the relay unit 3 that have received the data store the data in the storage buffers 25*a* and 34*a*, respectively. Note that a part of the moving entities 2 may be used as relay units 3.

<Third Communication Means S130>

Next, communication between the control device 1 and the relay unit 3 is carried out via wired communication Wc or long-distance wireless communication Ln (third communication means S130). In the third communication means S130, communication between the wired communication unit 13 of the control device 1 and the wired communication unit 32 of the relay unit 3 is carried out via wired communication Wc. Note that, when long-distance wireless communication Ln is used instead of wired communication Wc, the relay unit 3 is provided with a long-distance wireless communication unit, instead of the wired communication unit 32, and, furthermore, a moving entity 2 may be used as the relay unit 3. Also, with the third communication means S130, communication may be carried out via, for example, the Internet 4.

The third communication means S130 transmits the set of data stored in the storage buffer 34a of the relay unit 3, to the control device 1. After that, the set of data is transmitted to the user 9, depending on the situation. The control device 1 that has received the set of data stores the set of data in the memory unit 14. Note that, when, for example, the control device 1 stores identifiers that are included in the generated generation command data, the control device 1 may compare the identifiers associated with the received set of data with those identifiers stored, and receive only the data associated with the identifiers that match with the stored identifiers.

By this means, the operation of the wireless communication system 100 according to the present embodiment is finished. Note that, after the third communication means S130, for example, the first communication means S110 and the like may be implemented again.

(Embodiment: First Modification of Operation of Wireless Communication System 100)

Figure 4:
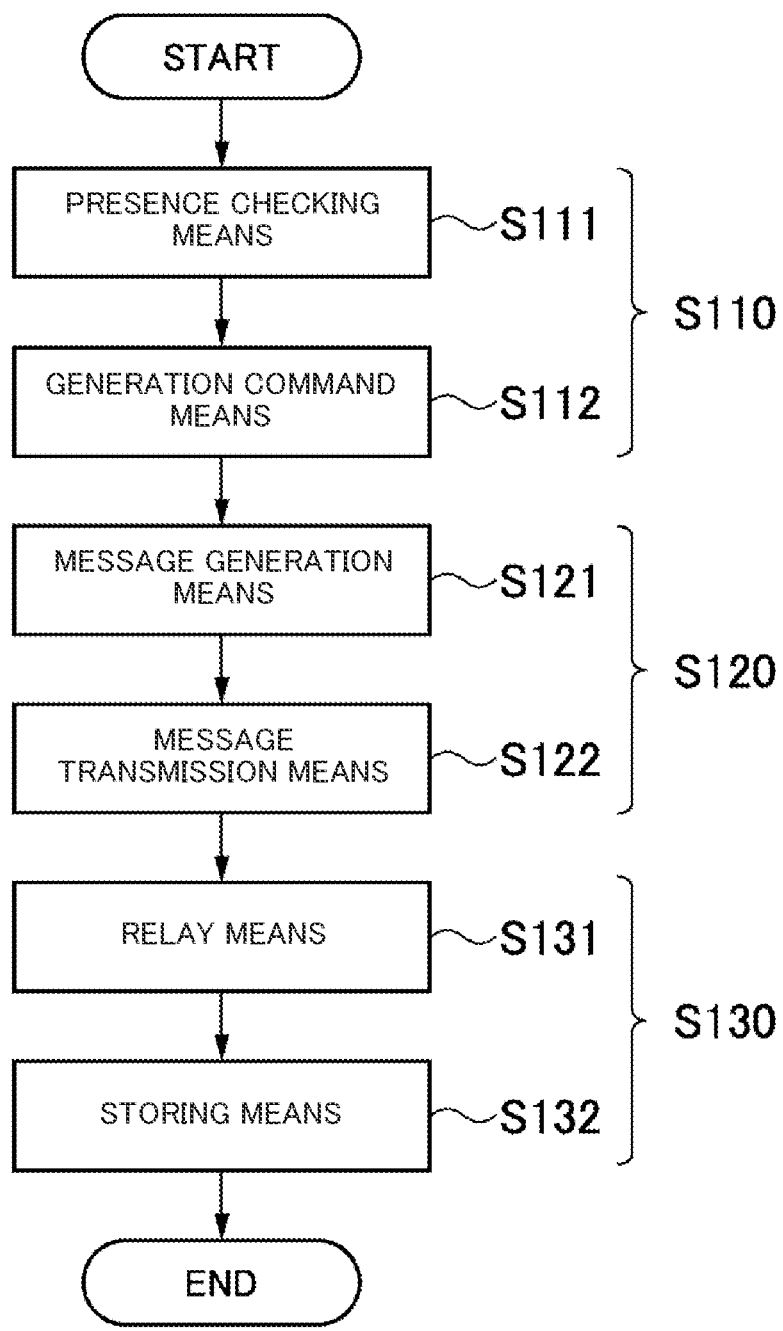
FIG. 4 is a flowchart to show a first modification of the operation of the wireless communication system according to the embodiment.

Next, a first modification of the operation of the wireless communication system 100 according to the present embodiment will be described. FIG. 4 is a flowchart to show the first modification of the operation of the wireless communication system 100 according to the present embodiment.

With the first modification, generation command data is generated and transmitted primarily based on the presence notification data generated by the moving entities 2.

As shown in FIG. 4, the first communication means S110 has, for example, a presence checking means S111 and a generation command means S112. In this case, the conditions of data forwarding for the moving entities 2 can be controlled by taking into account the communication status of the moving entities 2.

The second communication means S120 has, for example, a message generation means S121 and a message transmission means S122. In this case, the messages (data) generated based on generation command data can be collected efficiently in the relay unit 3.

The third communication means S130 has, for example, at least one of the relay means S131 and the storing means S132. By having the relay means S131, messages (data) can be collected easily, compared to the case where messages are transmitted directly from a plurality of moving entities 2 to the control device 1. Also, by having the storing means S132, the management of messages generated by the moving entities 2 can be easily realized by using the control device 1.

<<Presence Checking Means S111>>

In the presence checking means S111, presence notification data is periodically transmitted from each moving entity 2 to the control device 1, to indicate the state in which each moving entity 2 itself can communicate. The presence notification data is, for example, generated by the control unit 21 of the moving entities 2, and the frequency and cycle of transmitting the presence notification data are unspecified.

<<Generation Command Means S112>>

In the generation command means S112, generation command data is transmitted from the control device 1 that has received the presence notification data, to the moving entities 2 that have transmitted the presence notification data. The control unit 11 of the control device 1 generates generation command data based on the received presence notification data.

The presence notification data includes, for example, the address of each moving entity 2. In this case, the control device 1 judges, based on the presence notification data, whether or not to transmit the generation command data to each moving entity 2.

The presence notification data may include information that specifies the conditions of measurement, such as the surrounding environments, types, average speed of the moving entities 2 and so forth, besides the addresses. In this case, the control device 1 can select the moving entities 2 where the conditions are met and the data is worth collecting, based on the presence notification data. This makes it possible to improve the efficiency of data collection.

<<Message Generation Means S121>>

In the message generation means S121, messages are generated based on generation command data. The generation unit 24 of the moving entities 2 generates messages to include the identifiers included in the generation command data, TTLs, and sensor data corresponding to the specified sensor types. The sensor data is generated based on, for example, a signal acquired in the acquisition unit 24a.

<<Message Transmission Means S122>>

In the message transmission means S122, for example, messages are transmitted from moving entities 2 to the relay unit 3 or to other moving entities 2. In the message transmission means S122, messages are transmitted and received between the moving entities 2 based on, for example, anycast routing. For example, a moving entity 2 receives a message from another moving entity 2, and stores this message in the storage buffer 25a. After that, a message set (set of data), in which, in addition to the messages stored in the storage buffer 25a, other messages generated in the generation unit 24 are added, is transmitted to the other moving entity 2. That is, every time data is forwarded between moving entities 2, a set of data, in which messages generated by each moving entity 2 are stored, is forwarded. The stored set of data is eventually transmitted to the any of the relay unit 3.

<<Relay Means S131>>

With the relay means S131, the message group is transmitted from the relay unit 3 that has received the message group, to the control device 1. The control unit 11 of the control device 1 compares, for example, a plurality of identifiers included in the received message group, with the identifiers included in the already-issued generation command data. When these identifiers match, the control unit 11 determines that the messages have been generated based on the generation command data, and receives the messages including the matching identifiers.

<<Storing means S132>>

When the control device 1 receives messages generated based on generation command data, the storing means S132 adds the identifiers associated with the messages, to the list of delivered identifiers, which is built in advance, and stores this list. For example, the control unit 11 selects a message to include a TTL earlier than the current time, among a plurality of TTLs included in the received message group, adds the identifier included in the message to the delivered-identifier list, and stores this in the memory unit 14. Note that, when the control unit 11 finds a message including a TTL later than the current time, among a plurality of TTLs included in the received message group, the control unit 11 may delete or reject receiving this message.

This is the end of the first modification of the operation of the wireless communication system 100 according to the present embodiment. Note that, after the storing means S132, for example, the first communication means S110 or the like may be implemented again.

(Embodiment: Second Modification of Operation of Wireless Communication System 100)

Figure 5:
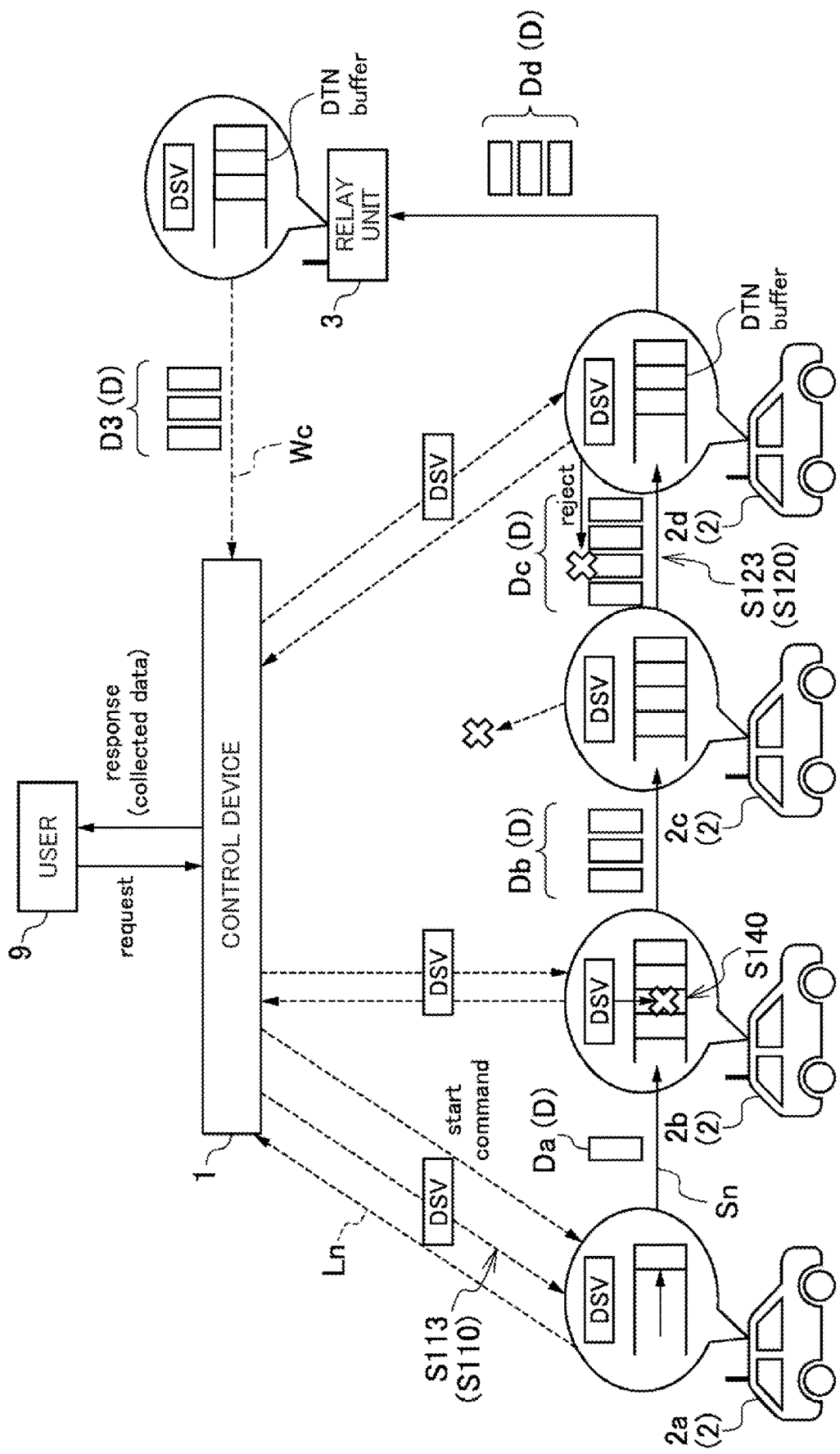
FIG. 5 is a schematic diagram to show a second modification of the operation of the wireless communication system according to the embodiment.

Next, a second modification of the operation of the wireless communication system 100 according to the present embodiment will be described. FIG. 5 is a schematic diagram to show the second modification of the operation of the wireless communication system 100 according to the present embodiment.

In the second modification, the data stored in the storage buffer 25a of the moving entities 2 is changed, primarily based on the delivered-identifier list (DTN buffer in FIG. 5).

In the second modification, for example, as shown in FIG. 5, the first communication means S110 has a list acquisition means S113 for allowing each moving entity 2 to acquire the delivered-identifier list DSV (Delivery Status Vector). The list acquisition means S113 is implemented after, for example, the storing means S132 described above.

In the list acquisition means S113, the moving entities 2 (2a, 2b, and 2d in FIG. 5) that are capable of communicating with the control device 1 acquire the delivered-identifier list DSV. The moving entities 2 store the acquired delivered-identifier list DSV in the storage buffer 25a or in the memory unit 26. In the list acquisition means S113, the distributed identifier list DSV may be transmitted from the control device 1 to the relay unit 3 via, for example, wired communication We or long-distance wireless communication Ln.

Note that the list acquisition means S113 may be implemented at the same time as the presence checking means S111, for example. The timing for each means is unspecified. Also, the frequency and cycle of transmitting the delivered-identifier list DSV from the control device 1 to the moving entities 2 are unspecified.

In the second modification, the wireless communication system 100 may further have a deletion means S140, after the list acquisition means S113. When a message associated with an identifier included in the delivered-identifier list DSV is stored in the storage buffer 25a of a moving entity 2, the deletion means S140 deletes the message stored in the storage buffer 25a. The DTN forwarding unit 25 of the moving entity 2 compares the identifiers included in the delivered-identifier list DSV with the identifiers included in the messages stored in the storage buffer 25a. When these identifiers match, the DTN forwarding unit 25 deletes the messages including the matching identifiers.

By implementing the deletion means S140, the messages collected in the control device 1 can be easily deleted, among a plurality of messages stored in the storage buffer 25a. Also, by implementing, for example, the second communication means S120 after implementing the deletion means S140, the volume of the message group db to transmit from the moving entity 2b to the moving entity 2c can be reduced, for example.

According to the second modification, the second communication means S120 may include a rejection means S123. The rejection means S123 is implemented after the list acquisition means S113.

When a message associated with an identifier included in the delivered-identifier list DSV is transmitted to a moving entity 2 (for example, the moving entity 2d in FIG. 5) having acquired the delivered-identifier list DSV, the rejection means S123 rejects receiving the message ("reject" in FIG. 5). The DTN forwarding unit 25 of the moving entity 2 compares the identifiers included in the delivered-identifier list DSV with the identifiers included in the message group D (for example, message group Dc of FIG. 5) transmitted to the moving entity 2. When these identifiers match, the DTN forwarding unit 25 rejects to receive the messages including the matching identifiers.

By implementing the rejection means S123, the data size of the message group D to receive can be reduced. Note that the rejection means S123 can be particularly effective when, for example, a message group Dc transmitted from a moving entity 2 (for example, the moving entity 2c in FIG. 5) that has not acquired the delivered-identifier list DSV is received.

Note that the deletion means S140 and the rejection means S123 described above may be implemented by, for example, the relay unit 3. In this case, the size of the message group D3 to be transmitted from the relay unit 3 to the control device 1 can be reduced.

According to the present embodiment, the first communication means S110 allows the control device 1 to control the conditions of data forwarding in a plurality of moving entities 2 via long-distance wireless communication Ln. Also, the second communication means S120 carries out communication between the moving entities 2 and the relay unit 3, or communication among the plurality of moving entities 2, via short-distance wireless communication Sn. Also, the third communication means S130 carries out communication between the control device 1 and the relay unit 3. Consequently, each moving entity 2 can transmit and receive data without involving long-distance wireless communication Ln. This makes it possible to collect data efficiently.

Also, according to the present embodiment, the second communication means S120 is implemented by using the DTN which employs the store-carry-and-forward-process. Consequently, even data that is generated from a moving entity 2 that is present in a location where communication with the relay unit 3 is difficult can be received via another moving entity 2. By this means, even when a plurality of moving entities 2 are present in a wide range, it is still possible to alleviate the decrease in the efficiency of collection of data.

Also, according to the present embodiment, the first communication means S110 has a presence checking means S111 and a generation command means S112 for transmitting generation command data from the control device 1 to the moving entities 2. Consequently, it is possible to control the conditions of data forwarding for the moving entities 2 by taking into account the communication status of the moving entities 2. This makes it possible to collect data even more efficiently.

Also, according to the present embodiment, the third communication means S130 has a relay means S131 for transmitting messages from the relay unit 3 to the control device 1. That is, the message is collected in the control device 1 via a communication means independent of short-distance wireless communication Sn. Consequently, messages (data) can be collected easily, compared to the case where messages are transmitted directly from a plurality of moving entities 2 to the control device 1. This makes it possible to collect data even more efficiently.

Also, according to the present embodiment, the third communication means S130 has a storing means S132 for adding the identifier associated with the message to the delivered-identifier list DSV and storing this. Consequently, the management of messages generated by the moving entities 2 can be easily realized by using the control device 1. This makes it possible to easily manage the data received from the moving entities 2.

Also, according to the present embodiment, when a message associated with an identifier included in the delivered-identifier list DSV is stored in the storage buffer 25a of a moving entity 2, the deletion means S140 deletes the message stored in the storage buffer 25a. By this means, it is possible to control the messages already transmitted to the control device 1 against occupying the storage buffer 25a for use for the DTN forwarding function. This makes it possible to reduce the volume of redundant traffic caused by messages (data) already transmitted.

Also, according to the present embodiment, the second communication means S120 has a rejection means S123 for rejecting to receive messages associated with the identifiers included in the delivered-identifier list DSV. Consequently, it is possible to prevent the messages already transmitted to the control device 1 from occupying the storage buffer 25a for use for the DTN forwarding function. This makes it possible to alleviate the increase in the volume of redundant traffic caused by messages (data) already transmitted.

Note that, for example, when the data size is relatively large, data is frequently generated, and the buffer size of the DTN forwarding function of the moving entity 2 is not so large, or when the band for long-distance wireless communication Ln is small and the connection fails frequently, and so forth, the wireless communication system 100 of the above-described embodiment is particularly effective. Also, when collecting a large amount of data (for example, for diagnosing of the failures, detecting anomaly, making a hazard map, etc.) from the connected cars, by using the wireless communication system 100 according to the present embodiment, it is possible to collect data particularly efficiently. In addition to the above, even in environments where communication facilities are not available, such as in developing countries, it is still possible to collect data efficiently using the wireless communication system 100 according to the present embodiment.

REFERENCE SIGNS LIST

1: control device
1a: cloud unit
1b: base station
11: control unit
12: long-distance wireless communication unit
13: wired communication unit
14: memory unit
2: moving entity
21: control unit
22: long-distance wireless communication unit
23: short-distance wireless communication unit
24: generation unit
24a: acquisition unit
25: DTN forwarding unit
25a: storage buffer
26: memory unit
3: relay unit
31: control unit
32: wired communication unit
33: short-distance wireless communication unit
34: DTN forwarding unit
34a: storage buffer
35: memory unit
4: Internet
9: user
100: wireless communication system
DSV: identifier list
Ln: long-distance wireless communication
Sn: short-distance wireless communication
Wc: wired communication
S110: first communication means
S120: second communication means
S130: third communication mean

The invention claimed is:

1. A wireless communication method that collects data generated from a plurality of moving entities, the wireless communication method comprising:
performing first communication in which a control device controls a condition of data forwarding in the moving entities, via long-distance wireless communication;
performing second communication that comprises carrying out communication between one of the moving entities and a relay, or communication among ones of the moving entities, via short-distance wireless communication, by using a DTN (Delay Tolerant Network), which employs a store-carry-and-forward process; and
performing third communication that comprises carrying out communication between the control device and the relay, or communication between the control device and one of the moving entities, via wired communication or the long-distance wireless communication,
wherein the first communication comprises transmitting generation command data, including a data identifier and a deadline for transmission, from the control device to the moving entities.

2. The wireless communication method according to claim 1, wherein the first communication comprises:
periodically transmitting presence notification data to indicate a communication reachability status of the moving entities, from the moving entities to the control device.

3. The wireless communication method according to claim 1, wherein the second communication comprises transmitting a message, generated based on the generation command data, from one of the moving entities that has received the generation command data, to the relay or another one of the moving entities, and
wherein the third communication comprises transmitting the message from the relay having received the message, to the control device.

4. The wireless communication method according to claim 3, wherein the third communication further comprises the control device receiving the message, generated based on the generation command data, from the relay, adding an identifier associated with the message to a delivered-identifier list, and storing the delivered-identifier list.

5. The wireless communication method according to claim 4, wherein the first communication comprises allowing the moving entities to acquire the delivered-identifier list, and wherein the wireless communication method further comprises performing a deletion processing by each of the moving entities, the deletion processing comprising, when a message associated with the identifier included in the delivered-identifier list is stored in a storage buffer of the moving entity, deleting the message stored in the storage buffer.

6. The wireless communication method according to claim 4, wherein the first communication comprises allowing the moving entities to acquire the delivered-identifier list, and wherein the second communication comprises performing a rejection processing by each of the moving entities, the rejection processing comprising, when a message associated with the identifier included in the delivered-identifier list is transmitted to the moving entity that has acquired the delivered-identifier list, rejecting receiving of the message.

7. A control device for a wireless communication system that collects data generated from a plurality of moving entities, wherein the moving entities communicate among each other or with a relay via short-distance wireless communication by using a DTN (Delay Tolerant Network) which employs a store-carry-and-forward process, the control device comprising:
 a memory; and
 a processor which executes one or more programs stored in the memory to carry out operations comprising:
 generating and transmitting to the moving entities, via long-distance wireless communication, generation command data that instructs the moving entities to collect data and controls a condition of data forwarding between the moving entities, the generation command data including a data identifier and a deadline for transmission;
 carrying out communication with the relay or with one of the moving entities, via wired communication or via the long-distance wireless communication, to obtain data that has been collected by the moving entities in response to the generation command data, the obtained data having been communicated among the moving entities or between at least one of the moving entities and the relay via the short-distance wireless communication by using the DTN (Delay Tolerant Network) which employs the store-carry-and-forward process.

8. A moving entity for a wireless communication system that collects data generated from a plurality of moving entities, the moving entity comprising:
 a memory; and
 a processor which executes one or more programs stored in the memory to carry out operations comprising:
 receiving, from a control device via long-distance wireless communication, generation command data that instructs the moving entity to collect data and controls a condition of data forwarding between the moving entities, the generation command data including a data identifier and a deadline for transmission;
 collecting data in response to the generation command data;
 carrying out communication with another one of the moving entities or with a relay via short-distance wireless communication by using a DTN (Delay Tolerant Network) which employs a store-carry-and-forward process, to transmit or receive data that has been collected in response to the generation command data.

9. A wireless communication system that collects data generated from a plurality of moving entities, the wireless communication system comprising:
 a relay;
 a control device; and
 a plurality of moving entities which communicate among each other or with the relay via short-distance wireless communication by using a DTN (Delay Tolerant Network) which employs a store-carry-and-forward process;
 wherein the control device comprises a memory and a processor which executes one or more programs stored in the memory to carry out operations comprising:
 generating and transmitting to the moving entities, via long-distance wireless communication, generation command data that instructs the moving entities to collect data and controls a condition of data forwarding between the moving entities, the generation command data including a data identifier and a deadline for transmission;
 carrying out communication with the relay or with one of the moving entities, via wired communication or via the long-distance wireless communication, to obtain data that has been collected by the moving entities in response to the generation command data, the obtained data having been communicated among the moving entities or between at least one of the moving entities and the relay via the short-distance wireless communication by using the DTN (Delay Tolerant Network) which employs the store-carry-and-forward process.

* * * * *